United States Patent
Kumar et al.

(10) Patent No.: US 12,511,211 B2
(45) Date of Patent: Dec. 30, 2025

(54) METHOD AND SYSTEM FOR MANAGING A SET OF ALERTS RELATED TO AN APPLICATION WORKFLOW

(71) Applicant: JPMorgan Chase Bank, N.A., New York, NY (US)

(72) Inventors: Santha Kumar, Bengaluru (IN); Ashish Bhandari, Berkeley Heights, NJ (US); Kumbeswaran Balasubramanian, Bangalore (IN); Zohra Tinwala, Bangalore (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 195 days.

(21) Appl. No.: 18/397,572

(22) Filed: Dec. 27, 2023

(65) Prior Publication Data
US 2025/0156289 A1  May 15, 2025

(30) Foreign Application Priority Data
Nov. 10, 2023  (IN) .............................. 202311076944

(51) Int. Cl.
*G06F 9/44* (2018.01)
*G06F 11/30* (2006.01)

(52) U.S. Cl.
CPC ........ *G06F 11/302* (2013.01); *G06F 11/3065* (2013.01)

(58) Field of Classification Search
CPC ........................... G06F 11/302; G06F 11/3065
See application file for complete search history.

(56) References Cited

U.S. PATENT DOCUMENTS

| | | | | |
|---|---|---|---|---|
| 2012/0144246 | A1* | 6/2012 | Dreyfoos | G06F 11/3466 714/47.1 |
| 2015/0019915 | A1* | 1/2015 | Kospiah | G06F 11/3604 714/38.1 |
| 2017/0329693 | A1* | 11/2017 | Li | G06F 11/3608 |
| 2021/0117263 | A1* | 4/2021 | Dunne | G06F 11/3636 |
| 2024/0345934 | A1* | 10/2024 | J | G06F 11/3612 |

* cited by examiner

*Primary Examiner* — Qamrun Nahar
(74) *Attorney, Agent, or Firm* — GREENBLUM & BERNSTEIN, P.L.C.

(57) ABSTRACT

A method and a system for managing a set of alerts related to an application workflow are disclosed. The method includes: detecting, by a processor via a build time architecture digitizer (BTAD), request for new infrastructure component provisioning; generating, via BTAD, updated architecture model; monitoring, via runtime architecture digitizer (RAD), set of services related to new infrastructure component; generating, via RAD, final architecture model; receiving, at alert enricher module (AEM) from database, set of alerts; mapping, via AEM, alerts with corresponding components of final architecture model; assigning, via AEM, corresponding components from final architecture model to alerts; enriching, via AEM, alerts with relevant metrics and log details; generating, via AEM, set of enriched alerts; and providing, via AEM, enriched alerts to manage set of alerts.

20 Claims, 7 Drawing Sheets

METHOD AND SYSTEM FOR MANAGING A SET OF ALERTS RELATED TO AN APPLICATION WORKFLOW

CROSS-REFERENCE TO RELATED APPLICATIONS

This application claims priority benefit from Indian Application No. 202311076944, filed on Nov. 10, 2023 in the India Patent Office, which is hereby incorporated by reference in its entirety.

BACKGROUND

Field of the Disclosure

This technology generally relates to alert management in site reliability engineering, and more particularly to methods and systems for managing a set of alerts related to an application workflow.

Background Information

The following description of the related art is intended to provide background information pertaining to the field of the present disclosure. This section may include certain aspects of the art that may be related to various features of the present disclosure. However, it should be appreciated that this section is used only to enhance the understanding of the reader with respect to the present disclosure, and not as an admission of the prior art.

In the past few years, a huge growth in digital technologies has been noted. The digital technologies now a days have been enhanced to a great extent enabling users of electronic devices to seamlessly execute various day-to-day tasks using their electronic devices. Mainly, over past few years several technologies have been developed leading to development of various digital platforms say for e.g., digital applications (or as used herein a "digital application" may be referred to as an "application") that may be accessed on smart electronic devices to performs certain tasks.

Moreover, now-a-days more and more applications are moving away from monolithic architecture to microservices. While a microservice architecture brings agility and scalability to an application, it also brings new runtime challenges to site reliability engineering (SRE) team. Thus, a number of solutions have been developed to mitigate the existing challenges pertaining to running of microservices, however, they are mostly focused on collecting metrics and logs related to the microservices, and the ability to visualize them. Additionally, some existing solutions further analyse the collected metrics to create interesting events for the SRE team, which in turn manages alert(s) or incident(s) that may occur during runtime of the microservices. The existing solutions have many limitations, for instance the existing solutions are inefficient in resolving the alert(s) or incident(s) as resolving the alert(s) or the incident(s) require a deep understanding of system architecture and component dependencies related to the application(s).

Also, architecture diagrams of the digital platforms include a variety of elements that illustrate occurrence of various events and interactions within various elements of systems of the digital platforms at different time points to implement features of the digital platforms. Each structure in an architecture diagram of a digital platform includes software elements, relations between the software elements, and properties of both structures of the architecture diagram and relation(s) between the structures. In terms of connections and interactions between components in the architecture diagrams and function(s) served by each component of the architecture diagrams, the architecture diagrams represent an order of events related to the components and interactions of the components. Architecture of an application or a digital product evolves and changes over a period of time due to various reasons such as changes introduced by market, new requirements, changes to business processes, and technology advances, among other things. It is currently a challenge to reflect changes occurring in an architectural state of an application at a point in time as and when the changes occur.

Currently, various modelling frameworks for understanding and creating architectures of the digital platforms are available. For example, C4 modelling framework that describes or defines the architectures of the digital platforms at different levels of details: for e.g., context, containers, components, and code. These models may also be used to manage alert(s) that are generated in a production stage of an application. However, a capability to automatically generate production alert(s) using such models for a given application, and an exercise of reflecting changes automatically in the models for any application does not exist in the existing solutions. The existing solutions rely on manual interventions. This manual exercise is extremely cumbersome especially for complex applications with numerous features and changing (that is, adding or deleting) even a small feature from architectures of such applications requires a lot of efforts in modification of the architectures, and therefore, the existing solutions are time-consuming as well. Further, a lot of knowledge and experience is required in managing the production alert(s), which is non-transferrable in a small amount of time.

Accordingly, in view of the above-mentioned and other existing limitations, there exists a need in the art to provide an efficient solution to overcome the limitations of the existing arts, and to develop a method and a system for automatically and efficiently managing production alert(s) in microservices architecture(s).

SUMMARY

The present disclosure, through one or more of its various aspects, embodiments, and/or specific features or sub-components, provides, inter alia, various systems, servers, devices, methods, media, programs, and platforms for managing a set of alerts related to an application workflow.

According to an aspect of the present disclosure, a method for managing a set of alerts related to an application workflow is disclosed. The method may include: detecting, by at least one processor via a build time architecture digitizer, a request for a new infrastructure component provisioning in an existing architecture model related to the application workflow; generating, by the at least one processor via the build time architecture digitizer, an updated architecture model based on the existing architecture model and the request for the new infrastructure component provisioning; monitoring, by the at least one processor via a runtime architecture digitizer, a set of services related to the new infrastructure component; generating, by the at least one processor via the runtime architecture digitizer, a final architecture model based on the set of services and the updated architecture model; receiving, by the at least one processor at an alert enricher module via a communication interface from a database, the set of alerts; mapping, by the at least one processor via the alert enricher module, at least one alert from among the set of alerts with at least one corresponding component from among the set of components of the final architecture model; assigning, by the at least one processor via the alert enricher module, the at least one corresponding component in the final architecture model to the at least one alert from among the set of alerts based on the mapping; enriching, by the at least one processor via the alert enricher module, the at least one alert from among the set of alerts with at least one from among a set of relevant metrics and a set of relevant log details based on the at least one corresponding component; generating, by the at least one processor via the alert enricher module, a set of enriched alerts based on the enriching of the at least one alert from among the set of alerts; and providing automatically, by the at least one processor via the alert enricher module on a user interface, at least one enriched alert from among the set of enriched alerts to manage the set of alerts.

In accordance with an exemplary embodiment, the method may further include: receiving, by the at least one processor at an alert correlator module, the at least one enriched alert from among the set of enriched alerts; comparing, by the at least one processor via the alert correlator module, the at least one enriched alert from among the set of enriched alerts with a set of open alerts based on at least one from among a set of inter-component dependencies and a set of historical co-occurrences; generating, by the at least one processor via the alert correlator module, a correlation score between the at least one enriched alert from among the set of enriched alerts and at least one open alert from among the set of open alerts based on the comparison; and providing automatically, by the at least one processor via the alert correlator module on the user interface, the correlation score to manage the set of alerts.

In accordance with an exemplary embodiment, the set of inter-component dependencies may indicate a dependency relation between the set of enriched alerts and the set of open alerts, and the set of historical co-occurrences may indicate a historical co-occurrence relation between the set of enriched alerts and the set of open alerts.

In accordance with an exemplary embodiment, the method may further include: receiving, by the at least one processor at the alert correlator module from a repository, an impact data corresponding to the set of alerts; generating, by the at least one processor via the alert correlator module, a severity score for the set of alerts based on the impact data; and providing automatically, by the at least one processor via the alert correlator module on the user interface, the severity score to manage the set of alerts.

In accordance with an exemplary embodiment, the correlation score suggests that a component that is most likely to be related to and affecting other components of the application workflow.

In accordance with an exemplary embodiment, the severity score suggests how likely is an end user to be impacted by malfunctioning of a component of the application.

In accordance with an exemplary embodiment, the new infrastructure component may be an infrastructure-as-code (IaC).

According to another aspect of the present disclosure, a computing device configured for managing a set of alerts related to an application workflow, is disclosed. The computing device may include a processor, a memory, and a communication interface coupled to each of the processor and the memory. The processor may be configured to: detect, via a build time architecture digitizer, a request for a new infrastructure component provisioning in an existing architecture model related to the application workflow; generate, via the build time architecture digitizer, an updated architecture model based on the existing architecture model and the request for the new infrastructure component provisioning; monitor, via a runtime architecture digitizer, a set of services related to the new infrastructure component; generate, via the runtime architecture digitizer, a final architecture model based on the set of services and the updated architecture model; receive, at an alert enricher module via the communication interface from a database, the set of alerts; map, via the alert enricher module, at least one alert from among the set of alerts with at least one corresponding component from among the set of components of the final architecture model; assign, via the alert enricher module, the at least one corresponding component in the final architecture model to the at least one alert from among the set of alerts based on the mapping; enrich, via the alert enricher module, the at least one alert from among the set of alerts with at least one from among a set of relevant metrics and a set of relevant log details based on the set of corresponding components; generate, via the alert enricher module, a set of enriched alerts based on the enriching of the at least one alert from among the set of alerts; and provide automatically, via the alert enricher module on a user interface, at least one enriched alert from among the set of enriched alerts to manage the set of alerts.

In accordance with an exemplary embodiment, the processor may be further configured to: receive, at an alert correlator module, the at least one enriched alert from among the set of enriched alerts; compare, via the alert correlator module, the at least one enriched alert from among the set of enriched alerts with a set of open alerts based on at least one from among a set of inter-component dependencies and a set of historical co-occurrences; generate, via the alert correlator module, a correlation score between the at least one enriched alert from among the set of enriched alerts and at least one open alert from among the set of open alerts based on the comparison; and provide automatically, via the alert correlator module on the user interface, the correlation score to manage the set of alerts.

In accordance with an exemplary embodiment, the set of inter-component dependencies may indicate a dependency relation between the set of enriched alerts and the set of open alerts, and the set of historical co-occurrences may indicate a historical co-occurrence relation between the set of enriched alerts and the set of open alerts.

In accordance with an exemplary embodiment, the processor may be further configured to: receive, at the alert correlator module from a repository, an impact data corresponding to the set of alerts; generate, via the alert correlator module, a severity score for the set of alerts based on the impact data; and provide automatically, via the alert correlator module on the user interface, the severity score to manage the set of alerts.

In accordance with an exemplary embodiment, the correlation score suggests that a component that is most likely to be related to and affecting other components of the application workflow.

In accordance with an exemplary embodiment, the severity score suggests how likely is an end user to be impacted by malfunctioning of a component of the application.

In accordance with an exemplary embodiment, the new infrastructure component is an infrastructure-as-code (IaC).

According to yet another aspect of the present disclosure, a non-transitory computer readable storage medium storing instructions for managing a set of alerts related to an application workflow, is disclosed. The instructions include executable code which, when executed by a processor, may cause the processor to: detect, via a build time architecture digitizer, a request for a new infrastructure component provisioning in an existing architecture model related to the application workflow; generate, via the build time architecture digitizer, an updated architecture model based on the existing architecture model and the request for the new infrastructure component provisioning; monitor, via a runtime architecture digitizer, a set of services related to the new infrastructure component; generate, via the runtime architecture digitizer, a final architecture model based on the set of services and the updated architecture model; receive, at an alert enricher module via the communication interface from a database, the set of alerts; map, via the alert enricher module, at least one alert from among the set of alerts with at least one corresponding component from among the set of components of the final architecture model; assign, via the alert enricher module, the at least one corresponding component in the final architecture model to the at least one alert from among the set of alerts based on the mapping; enrich, via the alert enricher module, the at least one alert from among the set of alerts with at least one from among a set of relevant metrics and a set of relevant log details based on the set of corresponding components; generate, via the alert enricher module, a set of enriched alerts based on the enriching of the at least one alert from among the set of alerts; and provide automatically, via the alert enricher module on a user interface, at least one enriched alert from among the set of enriched alerts to manage the set of alerts.

In accordance with an exemplary embodiment, when executed by the processor, the executable code may further cause the processor to: receive, at an alert correlator module, the at least one enriched alert from among the set of enriched alerts; compare, via the alert correlator module, the at least one enriched alert from among the set of enriched alerts with a set of open alerts based on at least one from among a set of inter-component dependencies and a set of historical co-occurrences; generate, via the alert correlator module, a correlation score between the at least one enriched alert from among the set of enriched alerts and at least one open alert from among the set of open alerts based on the comparison; and provide automatically, via the alert correlator module on the user interface, the correlation score to manage the set of alerts.

In accordance with an exemplary embodiment, the set of inter-component dependencies may indicate a dependency relation between the set of enriched alerts and the set of open alerts, and the set of historical co-occurrences may indicate a historical co-occurrence relation between the set of enriched alerts and the set of open alerts.

In accordance with an exemplary embodiment, when executed by the processor, the executable code may further cause the processor to: receive, at the alert correlator module from a repository, an impact data corresponding to the set of alerts; generate, via the alert correlator module, a severity score for the set of alerts based on the impact data; and provide automatically, via the alert correlator module on the user interface, the severity score to manage the set of alerts.

In accordance with an exemplary embodiment, the correlation score suggests that a component that is most likely to be related to and affecting other components of the application workflow.

In accordance with an exemplary embodiment, the severity score suggests how likely is an end user to be impacted by malfunctioning of a component of the application.

In accordance with an exemplary embodiment, the new infrastructure component is an infrastructure-as-code (IaC).

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

DETAILED DESCRIPTION

Figure 1:
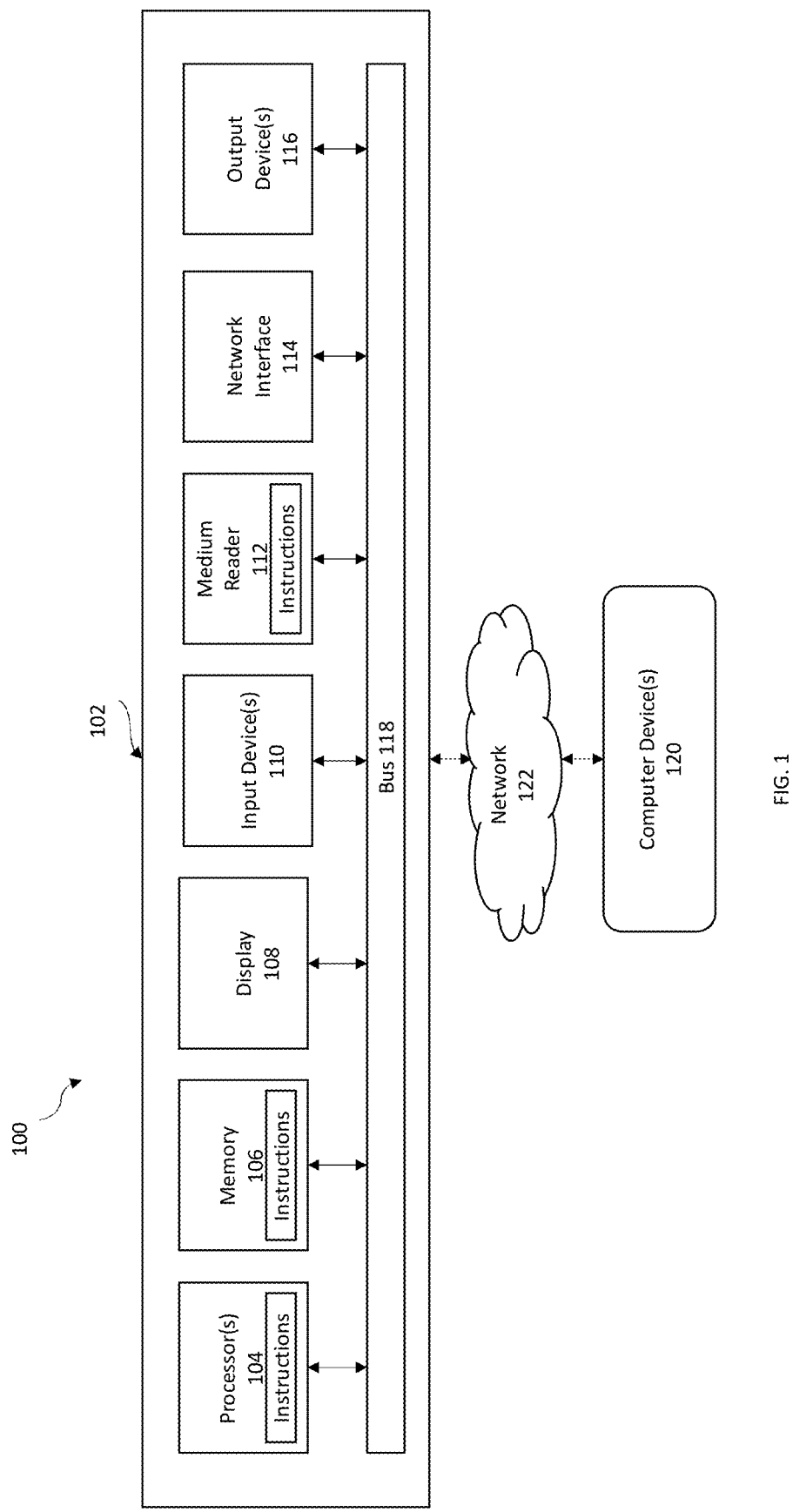
FIG. 1 illustrates an exemplary diagram of a computer system 100 for managing a set of alerts related to an application workflow, in accordance with an exemplary embodiment.

Exemplary embodiments now will be described with reference to the accompanying drawings. The exemplary embodiments may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "include", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items. Also, as used herein, the phrase "at least one" means and includes "one or more" and such phrases or terms can be used interchangeably. Furthermore, as used herein, the phrase "set of" means and includes "one or more" and such phrases or terms can be used interchangeably.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different.

In addition, all logical units and/or controllers described and depicted in the figures include the software and/or hardware components required for the unit to function. Further, each unit may comprise within itself one or more components, which are implicitly understood. These components may be operatively coupled to each other and be configured to communicate with each other to perform the function of the said unit.

In the following description, for the purposes of explanation, numerous specific details have been set forth in order to provide a description of the invention. It will be apparent however, that the invention may be practiced without these specific details and features.

Through one or more of its various aspects, embodiments and/or specific features or sub-components of the present disclosure, are intended to bring out one or more of the advantages as specifically described above and noted below.

The examples may also be embodied as one or more non-transitory computer readable storage medium having instructions stored thereon for one or more aspects of the present technology as described and illustrated by way of the examples herein. The instructions in some examples include executable code that, when executed by one or more processors, causes the processors to carry out steps necessary to implement the methods of the examples of this technology that are described and illustrated herein.

To overcome the problems associated with existing solutions developed for managing production alerts, the present disclosure provides a method and a system for managing a set of alerts related to an application workflow. To manage alerts related to an application workflow, initially the system detects a request for a new infrastructure component provisioning in an existing architecture model related to the application workflow. Thereafter, based on the detection of the request the system generates an updated architecture model based on the existing architecture model and the request for the new infrastructure component provisioning. The system then monitors a set of services related to the new infrastructure component. Further, the system generates a final architecture model based on the set of services and the updated architecture model. The system thereafter receives a set of alerts and then maps at least one alert from among the set of alerts with at least one corresponding component from among the set of components of the final architecture model. Further, the system assigns the at least one corresponding component in the final architecture model to the at least one alert from among the set of alerts based on the mapping. The system further enriches the at least one alert from among the set of alerts with at least one from among a set of relevant metrics and a set of relevant log details based on the at least one corresponding component. Further, the system generates a set of enriched alerts based on the enriching of the at least one alert from among the set of alerts, and provides at least one enriched alert from among the set of enriched alerts to manage the set of alerts. Further, the system compares the at least one enriched alert from among the set of enriched alerts with a set of open alerts based on at least one from among a set of inter-component dependencies and a set of historical co-occurrences. The system thereafter generates a correlation score between the at least one from among the at least one alert from among the set of enriched alerts and at least one open alert from among the set of open alerts based on the comparison. Further, the system provides the correlation score to manage the set of alerts.

Therefore, the present disclosure provides a technical solution for managing alerts related to an application workflow. Also, the present disclosure provides the technical solution that overcomes the limitations of existing solutions such as including but is not limited to managing alerts as separate work items. Moreover, the technical solution as disclosed in the present disclosure provides technical effect and technical advantage over the existing solutions, as the technical solution encompasses: 1) presenting alerts with context, like service details, deployment state, upstream and downstream services etc., 2) bringing design, e.g., architecture, and runtime, or alerts together to solve for managing production alerts, and 3) reducing mean time to resolve (MTTR) an alert, at least by training site reliability engineering (SRE) team members with same material and approach that the SRE team member need to use for resolving an alert, hence making them more productive. Particularly, the present solution helps the SRE team members to look at an alert from a system architecture standpoint, and get corresponding dependent components that are impacted and a set of metrics. This helps reducing the mean time to resolve an alert.

FIG. 1 depicts an exemplary system 100 for use in accordance with the embodiments described herein. The system 100 as depicted in FIG. 1 is generally shown and may include a computer system 102, which is generally indicated. The term "computer system" may also be referred to as "computing device" and such phrases/terms can be used interchangeably in the specifications.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud-based environment. Even further, the instructions may be operative in a such cloud-based computing environment.

In a networked deployment, the computer system 102 may operate in the capacity of a server or as a client-user computer in a server-client user network environment, a client-user computer in a cloud-based computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smartphone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application-specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read-only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, and unsecure and/or unencrypted. As regards the present disclosure, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software, or any combination thereof which are commonly known and understood as being included with or within a computer system, such as, but is not limited to, a network interface 114 and an output device 116. The output device 116 may be, but is not limited to, a speaker, an audio out, a video out, a remote-control output, a printer, or any combination thereof. Additionally, the term "Network interface" may also be referred to as "Communication interface" and such phrases/terms can be used interchangeably in the specifications.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but is not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near-field communication, ultra-band, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide for managing a set of alerts related to an application workflow.

Figure 2:
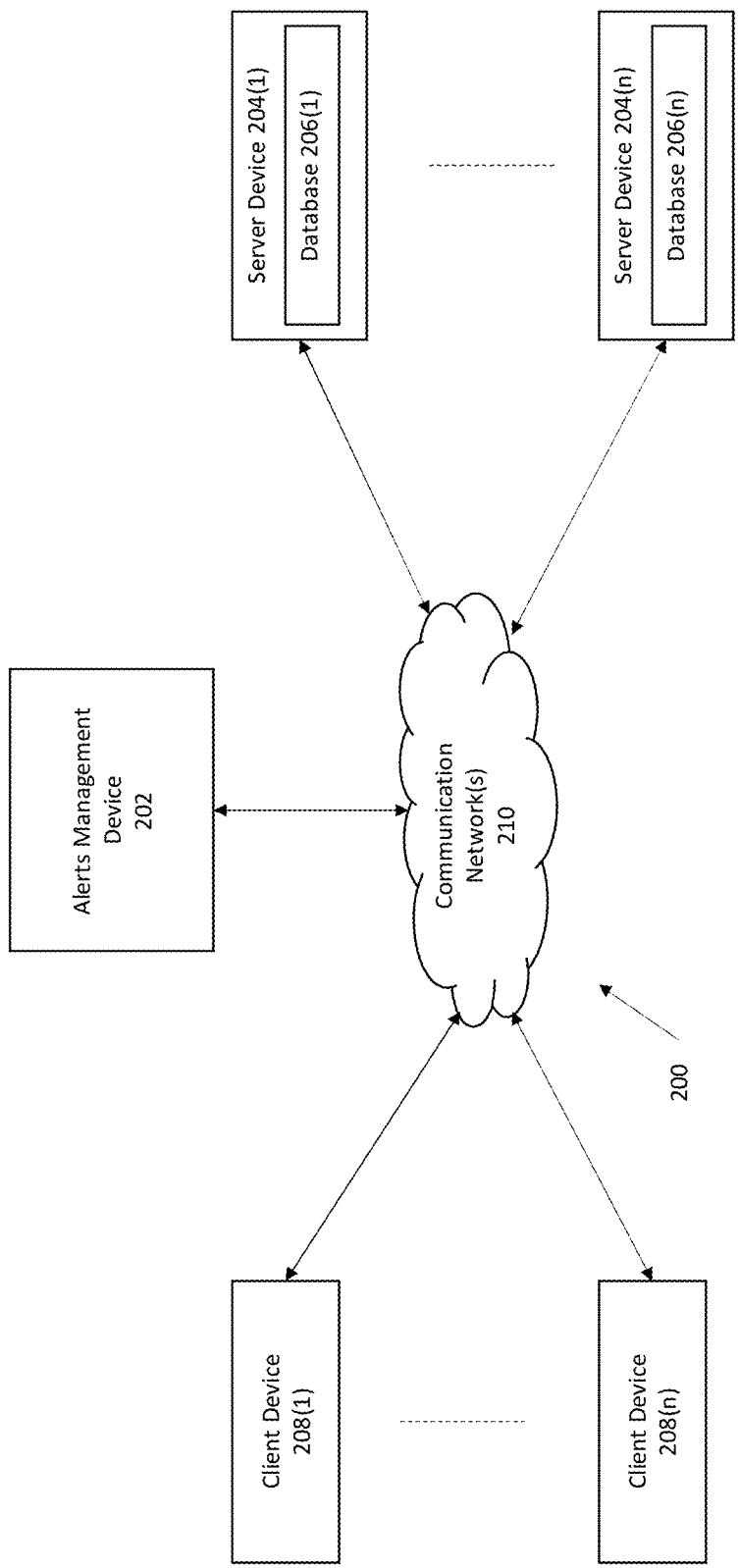
FIG. 2 illustrates an exemplary diagram 200 of a network environment for managing a set of alerts related to an application workflow, in accordance with an exemplary embodiment.

Referring to FIG. 2, a schematic of an exemplary network environment 200 for implementing a method for managing a set of alerts related to an application workflow is illustrated. In an exemplary embodiment, the method is executable on any networked computer platform, such as, for example, a personal computer (PC).

The method for managing a set of alerts related to an application workflow may be implemented by an Alerts Management (AM) Device 202. The AM device 202 may be the same or similar to the computer system 102 as described with respect to FIG. 1. The AM device 202 may store one or more applications that can include executable instructions that, when executed by the AM device 202, cause the AM device 202 to perform desired actions, such as to transmit, receive, or otherwise process network messages, for example, and to perform other actions described and illustrated below with reference to the figures. The application(s) may be implemented as modules or components of other applications. Further, the application(s) may be implemented as operating system extensions, modules, plugins, or the like.

Even further, the application(s) may be operative in a cloud-based computing environment. The application(s) may be executed within or as a virtual machine(s) or virtual server(s), that may be managed in a cloud-based computing environment. Also, the application(s), and even the AM device 202 itself, may be located in the virtual server(s) running in a cloud-based computing environment rather than being tied to one or more specific physical network computing devices. Also, the application(s) may be running in one or more virtual machines (VMs) executing on the AM device 202. Additionally, in one or more embodiments of this technology, the virtual machine(s) running on the AM device 202 may be managed or supervised by a hypervisor.

In the network environment 200 of FIG. 2, the AM device 202 is coupled to a plurality of server devices 204(1)-204(n) that hosts a plurality of databases or repositories 206(1)-206(n), and also to a plurality of client devices 208(1)-208(n) via communication network(s) 210. A communication interface of the AM device 202, such as the network interface 114 of the computer system 102 of FIG. 1, operatively couples and communicates between the AM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer-readable storage media, and AM devices 202 that efficiently implement a method for managing a set of alerts related to an application workflow, the method being implemented by at least one processor 104.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Networks (PSTNs), Ethernet-based Packet Data Networks (PDNs), combinations thereof, and the like.

The AM device 202 may be a standalone device or integrated with one or more other devices or apparatuses, such as one or more of the server devices 204(1)-204(n), for example. In one particular example, the AM device 202 may include or be hosted by one of the server devices 204(1)-204(n), and other arrangements are also possible. Moreover, one or more of the devices of the AM device 202 may be in a same or a different communication network including one or more public, private, or cloud-based networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. In an example, the server devices 204(1)-204(n) may process requests received from the AM device 202 via the communication network(s) 210 according to Hypertext Transfer Protocol (HTTP)-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) host the databases or repositories 206(1)-206(n) that are configured to store data that relates to at least one from among: 1) an information related to a set of alerts, 2) an information related to a set of open alerts and a set of historical alerts.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to-peer architecture, virtual machines, or within a cloud-based architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the AM device 202 via the communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, e.g., a smartphone.

The client devices 208(1)-208(n) may run interface applications, such as standard web browsers or standalone client applications, which may provide an interface to communicate with the AM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the AM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AM device 202, the server devices 204(1)-204(n), or the client devices 208(1)-208(n), for example, may be configured to operate as virtual instances on the same physical machine. In other words, one or more of the AM devices 202, the server devices 204(1)-204(n), or the client devices 208(1)-208(n) may operate on the same physical device rather than as separate devices communicating through a communication network(s) 210. Additionally, there may be more or fewer AM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
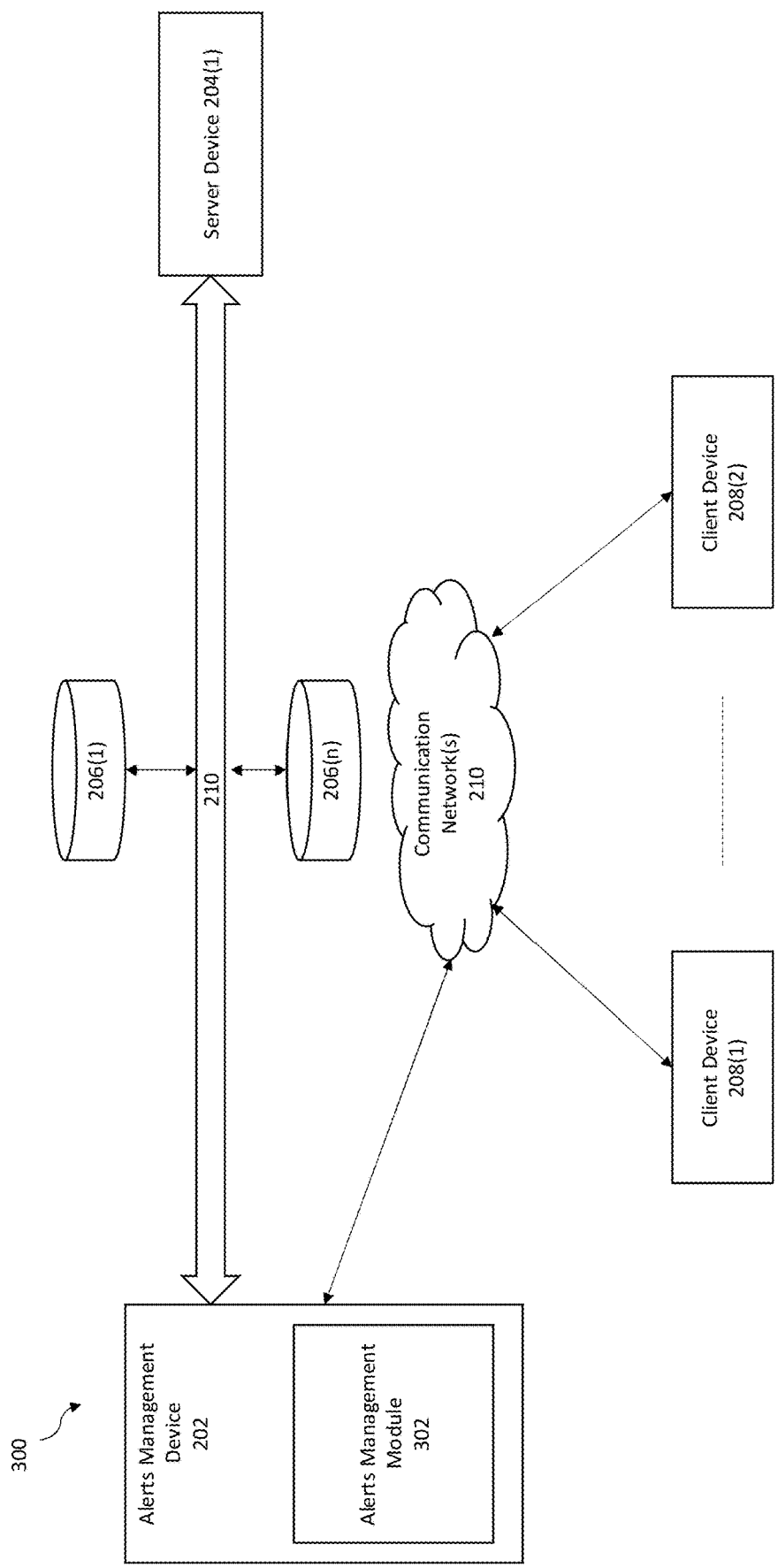
FIG. 3 illustrates an exemplary diagram of a system 300 for implementing a method for managing a set of alerts related to an application workflow, in accordance with an exemplary embodiment.

FIG. 3 illustrates an exemplary system for implementing a method for managing a set of alerts related to an application workflow, in accordance with an exemplary embodiment. As illustrated in FIG. 3, according to exemplary embodiments, the system 300 may comprise an AM device 202 including an Alerts Management (AM) module 302 that may be connected to a server device 204(1) and one or more repository from the repositories 206(1) . . . 206(n) via a communication network 210, but the present disclosure is not limited thereto.

The AM device 202 is described and shown in FIG. 3 as including the Alerts Management (AM) Module 302, although it may include other rules, policies, modules, databases, or applications, for example. As will be described below, the AM Module 302 is configured to implement a method for managing a set of alerts related to an application workflow.

An exemplary process for implementing a mechanism for managing a set of alerts related to an application workflow by utilizing the network environment of FIG. 2 is shown as being executed in FIG. 3. Specifically, a first client device 208(1) and a second client device 208(2) are illustrated as being in communication with AM device 202. In this regard, the first client device 208(1) and the second client device 208(2) may be "clients" of the AM device 202 and are described herein as such. Nevertheless, it is to be known and understood that the first client device 208(1) and/or the second client device 208(2) need not necessarily be "clients" of the AM device 202, or any entity described in association therewith herein. Any additional or alternative relationship may exist between either or both of the first client device 208(1) and the second client device 208(2) and the AM device 202, or no relationship may exist.

Further, AM device 202 is illustrated as being able to access the one or more repositories 206(1) . . . 206(n). The AM module 302 may be configured to access these databases for implementing the method for managing a set of alerts related to an application workflow.

The first client device 208(1) may be, for example, a smartphone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both the first client device 208(1) and the second client device 208(2) may communicate with the AM device 202 via broadband or cellular communication. Of course, these embodiments are merely exemplary and are not limiting or exhaustive.

Figure 4:
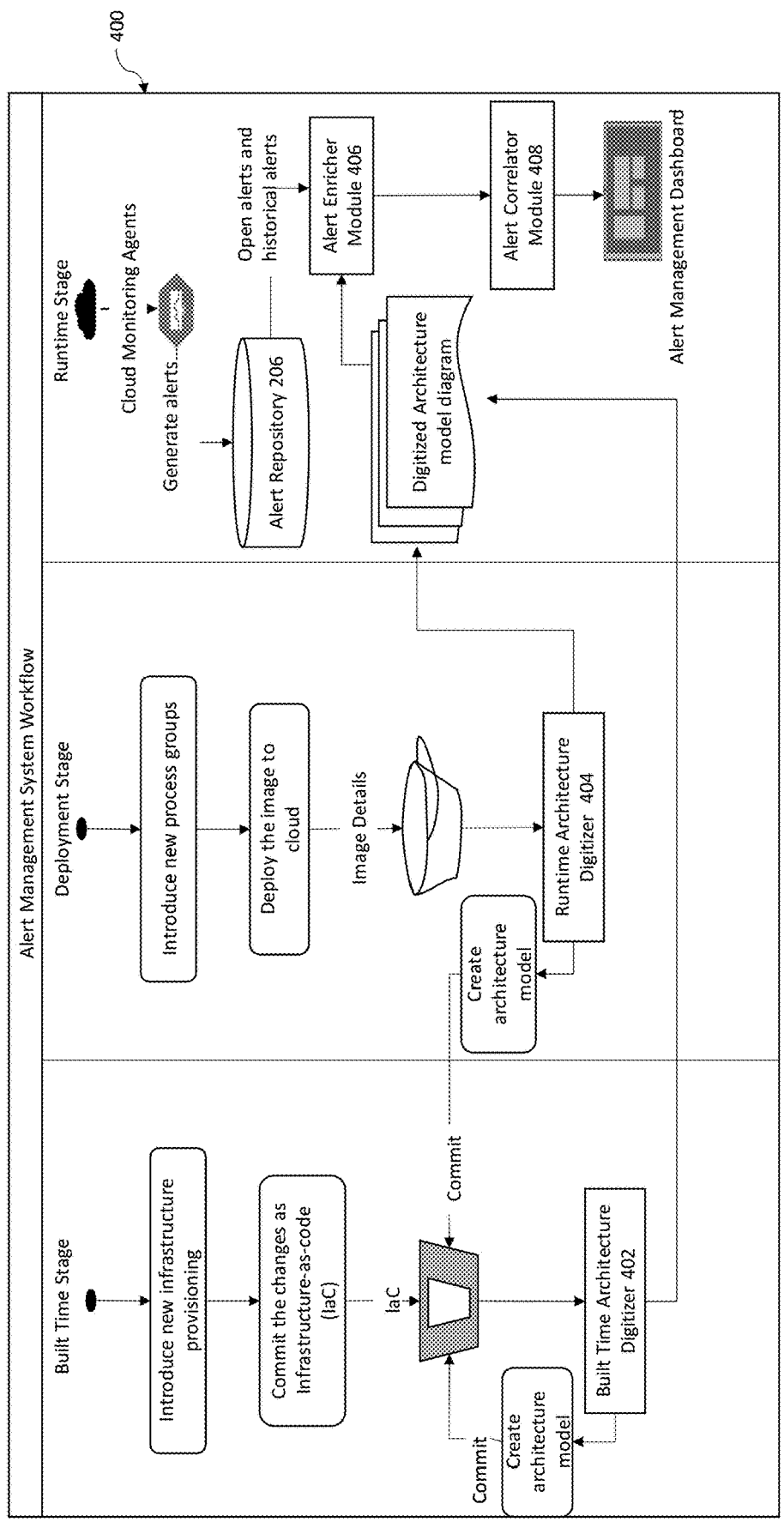
FIG. 4 illustrates an exemplary architecture diagram of a system 400 for managing a set of alerts related to an application workflow, in accordance with an exemplary embodiment.

An exemplary block diagram of an exemplary system 400 for implementing the method for managing a set of alerts related to an application workflow is generally indicated in FIG. 4. As shown in FIG. 4, the system 400 includes a build time architecture digitizer 402, a runtime architecture digitizer 404, an alert enricher module 406, an alert correlator module 408, and a repository 206. Also, while only a few units are shown in FIG. 4, the system 400 may include multiple such units or any such number of units as is obvious to a person skilled in the art or as is required to implement the features of the present disclosure.

Upon being started, the system 400 executes the method for managing a set of alerts related to an application workflow. An exemplary method for managing a set of alerts related to an application workflow is generally indicated at flowchart 500 in FIG. 5.

Figure 5:
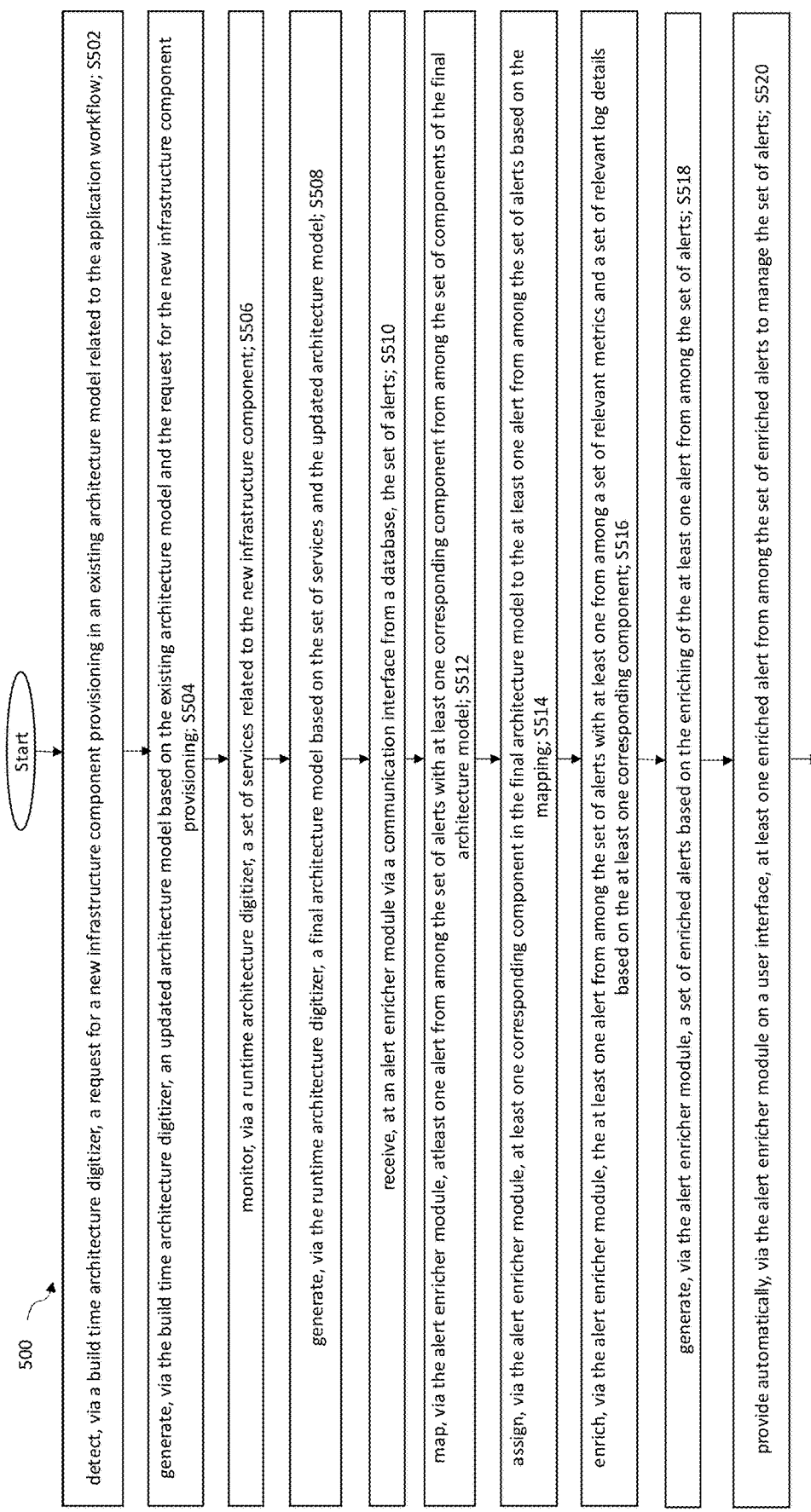
FIG. 5 illustrates an exemplary method flow diagram for managing a set of alerts related to an application workflow, in accordance with an exemplary embodiment.

In the method 500 of FIG. 5, at step S502 the method includes detecting, by at least one processor 104 via a build time architecture digitizer 402, a request for a new infrastructure component provisioning in an existing architecture model related to the application workflow. For example, a user, say, a developer, needs a new database to be provisioned in an architecture of an application. Thus, the user creates a request for provisioning the new database. In exemplary implementation, a new infrastructure component after provisioning is changed to an infrastructure-as-code (IaC). In exemplary implementation, at build time stage, the build time architecture digitizer 402 keeps checking continuously or at regular intervals whether any new infrastructure provisioning request has been created. In case the new infrastructure provisioning request has been created, the build time architecture digitizer 402 finds the created request, it picks up the created request for updating the architecture model based on this new infrastructure provisioning request. In this example, since the infrastructure provisioning request has been created, the build time architecture digitizer 402 picks the new infrastructure provisioning request for generating an updated architecture model based on the same.

At step S504, the method includes generating, by the at least one processor 104 via the build time architecture digitizer 402, an updated architecture model based on the existing architecture model and the request for the new infrastructure component provisioning. Continuing with the above example where the build time architecture digitizer 402 finds the new infrastructure provisioning request, the build time architecture digitizer 402 picks this new infrastructure provisioning request and updates the existing architecture model based on the new infrastructure provisioning request. In exemplary implementation, this architecture model is a C4 architecture model as generally known in the art, however, the present disclosure is not limited thereto. In other exemplary implementations, the architecture model is based on other platforms. Thus, continuing with the above example, at this step S504, the build time architecture digitizer 402 pushes the updated C4 architecture model to the application workflow indicating that a new database is to be added in the application.

At step S506, the method includes monitoring, by the at least one processor 104 via a runtime architecture digitizer 404, a set of services related to the new infrastructure component. In the existing process of updating the application's architecture model based on the new infrastructure provisioning request, it was not feasible to determine which services might be affected by the provisioning of the new infrastructure. In an exemplary implementation of the present disclosure, in case the new database is provisioned, there may be multiple services that may get connected with the database. Continuing with the above example, at deployment stage, an information is available regarding which services are connected to or expected to get connected to the newly provisioned database. This information is further collected and used by the runtime architecture digitizer 404 to further update the architecture model. Thus, at this step, the runtime architecture digitizer 404 monitors the set of services related to the new infrastructure component.

At step S508, the method includes generating, by the at least one processor 104 via the runtime architecture digitizer 404, a final architecture model based on the set of services and the updated architecture model. At this step S508, the runtime architecture digitizer 404 further appends the information related to the set of services that are connected to or expected to get connected to the newly provisioned infrastructure in the application architecture model. This results in a final architecture model that is obtained by appending the information related to the set of services that are connected to or expected to get connected to the newly provisioned infrastructure, e.g., the model that was obtained in step S504. Thus, a 'living document' is created at this step which is updated automatically by the system as and when the user creates a new infrastructure provisioning request.

At step S510, the method includes receiving, by the at least one processor 104 at an alert enricher module 406 via a communication interface from a database 206, the set of alerts. Now for example, there is an issue in a component, or there is an issue in a database that is provisioned in the application architecture. Thus, for the purposes of this example, all services that are connected to this existing database start malfunctioning or stop functioning. There are monitoring tools that regularly check for proper functioning, example, healthy functioning of all components in the application architecture. In exemplary implementation, where a component is not working fine, an alert is generated. Continuing with the above example, where the database is malfunctioning, the services related to the database also get affected and in such case, multiple alerts related to the database and the affected services get generated. These generated set of alerts are, at step S510, received by the at least one processor 104 at the alert enricher module 406.

At step S512, the method includes mapping, by the at least one processor 104 via the alert enricher module 406, at least one alert from among the set of alerts with at least one corresponding component from among the set of components of the final architecture model. For example, the term 'corresponding component' refers to that component within the final architecture model to which at least one specific alert is related. For example, an alert, 'Alert A' from a set of alerts that includes 'Alert A', 'Alert B', and 'Alert C') may be mapped with its corresponding component, 'Component X', from a set of components that includes 'Component X', 'Component Y', and 'Component Z'. In a non-limiting exemplary implementation, at least one alert may be mapped with two or more components.

At step S514, the method includes assigning, by the at least one processor 104 via the alert enricher module 406, the at least one corresponding component in the final architecture model to the at least one alert from among the set of alerts based on the mapping. Here, the alert enricher module 406 assigns the alert against the most relevant component found in the architecture model. Thus, each alert is assigned a corresponding component of the architecture model to which the alert relates.

At step 516, the method includes enriching, by the at least one processor 104 via the alert enricher module 406, the at least one alert from among the set of alerts with at least one from among a set of relevant metrics and a set of relevant log details based on the at least one corresponding component. At this step, the alert enricher module 406 identifies the relevant metrics and the relevant log details of the component, that is, the most relevant component related to the alert. Further, this is done for each alert separately and thus, a separate set of relevant metrics and relevant log details is identified for each of the alerts. At this step S516, this identified corresponding set of relevant metrics and relevant log details for each alert is appended to each of the alert to which the set of relevant metrics and relevant log details is related. Thus, each alert is appended with a corresponding set of relevant metrics and relevant log details.

At step S518, the method includes generating, by the at least one processor 104 via the alert enricher module 406, a set of enriched alerts based on the enriching of the at least one alert from among the set of alerts. At this step, based on the appending of the corresponding set of relevant metrics and relevant log details for each of the alerts, the set of enriched alerts is generated.

At step S520, the method includes providing automatically, by the at least one processor 104 via the alert enricher module 406 on a user interface, at least one enriched alert from among the set of enriched alerts to manage the set of alerts. The set of enriched alerts is shown at the user interface.

In exemplary implementation, the set of enriched alerts is also sent to the alert correlator module 408 for further processing for managing the set of alerts of the application workflow. Thus, in this exemplary implementation, the method includes receiving, by the at least one processor 104 at the alert correlator module 408, the at least one enriched alert from among the set of enriched alerts, from the alert enricher module 406. Further, the method includes comparing, by the at least one processor 104 via the alert correlator module 408, the at least one enriched alert from among the set of enriched alerts with a set of open alerts based on at least one from among a set of inter-component dependencies and a set of historical co-occurrences. In another exemplary implementation, the set of inter-component dependencies indicates a dependency relation between the set of enriched alerts and the set of open alerts, and the set of historical co-occurrences indicates a historical co-occurrence relation between the set of enriched alerts and the set of open alerts. This means that the dependencies of each of the component on one another may be seen and also the historical data may be considered where the occurrence of the same or similar alert was found. Also, this may imply that the alert for the malfunctioning of the component may be due to the same reason as was found earlier. Further, in this exemplary implementation, the method includes generating, by the at least one processor 104 via the alert correlator module 408, a correlation score between the at least one enriched alert from among the set of enriched alerts and at least one open alert from among the set of open alerts based on the comparison. The correlation score suggests that the component that is most likely to be related to and affecting other components of the application architecture. For example, a set of alerts related to a database as well multiple services related to the database is generated. The correlation score suggests that the database is a common component that is related to all other components for which alerts are generated. Thus, the correlation score would suggest that it might be the database that is the root cause of malfunctioning of all other components in the application architecture. This was previously being done manually by the user with years of experience and hit and trial method to estimate that a particular component of the system might be creating such problem. Now the system generates a correlation score which suggests a single component or the list of components that are most likely to cause a problem in the system. Thus, in this exemplary implementation, the method includes providing automatically, by the at least one processor 104 via the alert correlator module 408 on the user interface, the correlation score to manage the set of alerts.

In an exemplary implementation, data related to the alerts generated, may be stored in repository 206. Pertinently, this repository may form part of the same memory unit in which the database 206 is stored, or may form a separate part of the memory. Also, this repository may lie separately in another memory unit other than the memory in which the database 206 resides but is referred to as repository 206 for ease of usage and clear explanation in this disclosure. In this exemplary implementation, the method includes receiving, by the at least one processor 104 at the alert correlator module 408 from a repository, an impact data corresponding to the set of alerts. Further, in this exemplary implementation, the method includes generating, by the at least one processor 104 via the alert correlator module 408, a severity score for the set of alerts based on the impact data. Further, in this exemplary implementation, the method includes providing automatically, by the at least one processor 104 via the alert correlator module 408 on the user interface, the severity score to manage the set of alerts. The severity score suggests how likely is the end user to be impacted by the malfunctioning of the component of the application. For example, an event may be categorized in one of a low severity event, medium severity event, and a high severity event. For example, a low severity event indication may be issued just when a system knows that something is working perfectly, a medium severity event indication may be issued when something has got shut, and a high severity event indication may be issued when the end user is impacted by the malfunctioning of the component. For example, a database is shut down in one of the zones due to a short circuit. However, a secondary database is also installed which is healthy and can serve the users. In such case, the end user is not impacted but the issue needs to be resolved since if the secondary database faces an issue, then the end user will be affected. In such a case, a medium severity event indication may be issued. Also, if both databases get affected due to some reason, the alert correlator module 406 may increase the severity score and issue a high severity event indication in that case. This is done by the alert correlator module 406 by comparing the components with the architecture diagram which, for example, shows how many databases are present for the application workflow.

Figure 6:
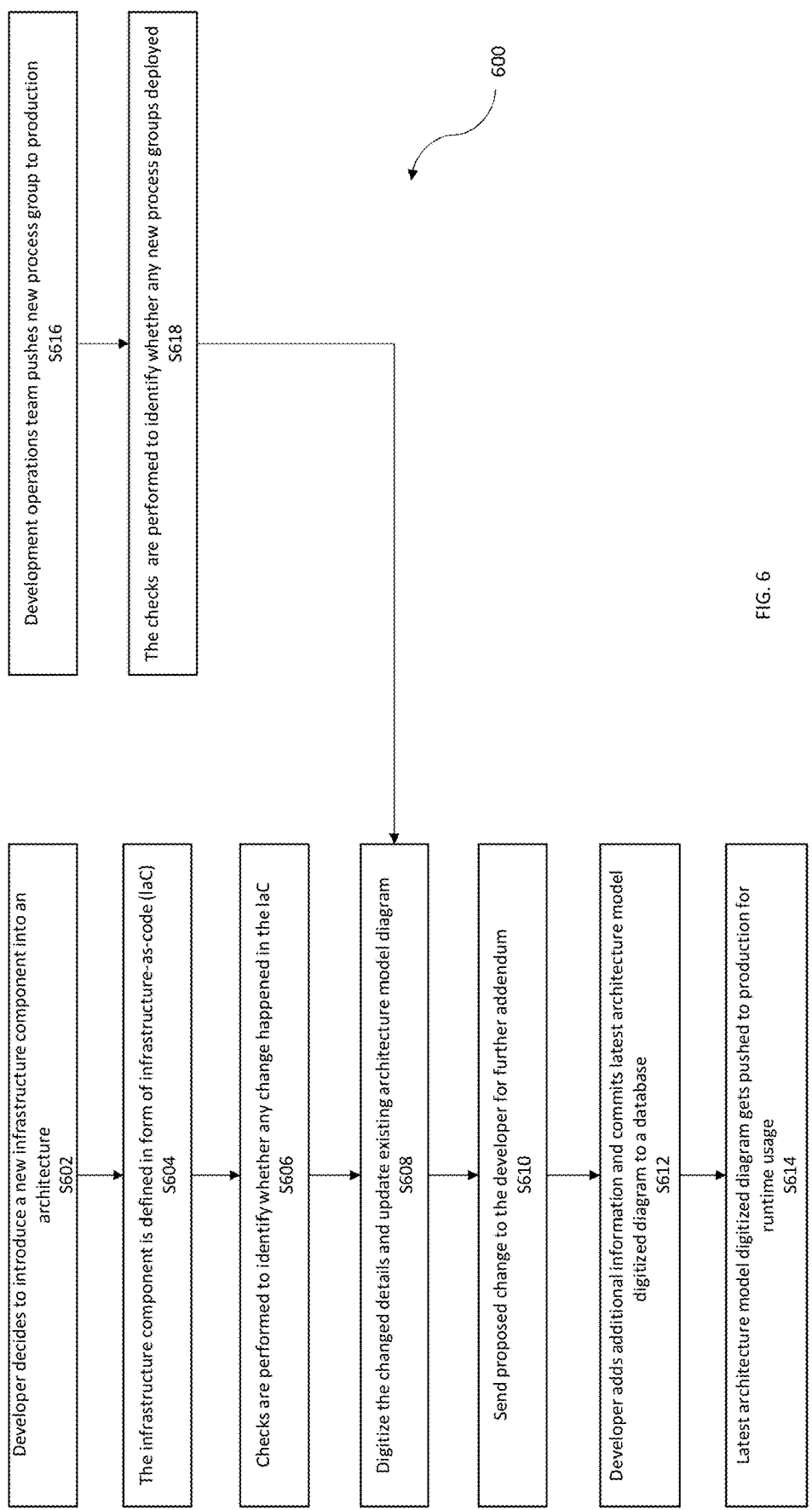
FIG. 6 illustrates an exemplary method flow diagram for providing an architecture model digitized diagram for providing a set of alerts via the alert enricher module, in accordance with an exemplary embodiment.

Referring to FIG. 6, an exemplary method flow diagram for providing an architecture model digitized diagram for providing a set of alerts via the alert enricher module, in accordance with an exemplary embodiment, is shown.

In the method 600 of FIG. 6, at step S602, as shown, a developer decides to introduce a new infrastructure component into an architecture. Further, at step S604, the new infrastructure component is defined in a form of infrastructure-as-code (IaC). Further, at step S606, checks are performed to identify whether any change happened in the IaC. Also, as shown at step 616, the development operations (DevOps) team pushes a new process group to production, the process group referring to a collection of related processes which can all be communicated with together at once. Also, as shown at step 618, the checks are performed to identify whether any new process groups are deployed. This input is used for updating an existing architecture model diagram. At step S608, the changed details are digitized and the existing architecture model diagram is updated. At step S610, the proposed changes are sent to the developer for further addendum. At step S612, the developer adds additional information and commits a latest architecture model digitized diagram to a database. At step S614, the latest architecture model digitized diagram gets pushed to production for runtime usage.

Figure 7:
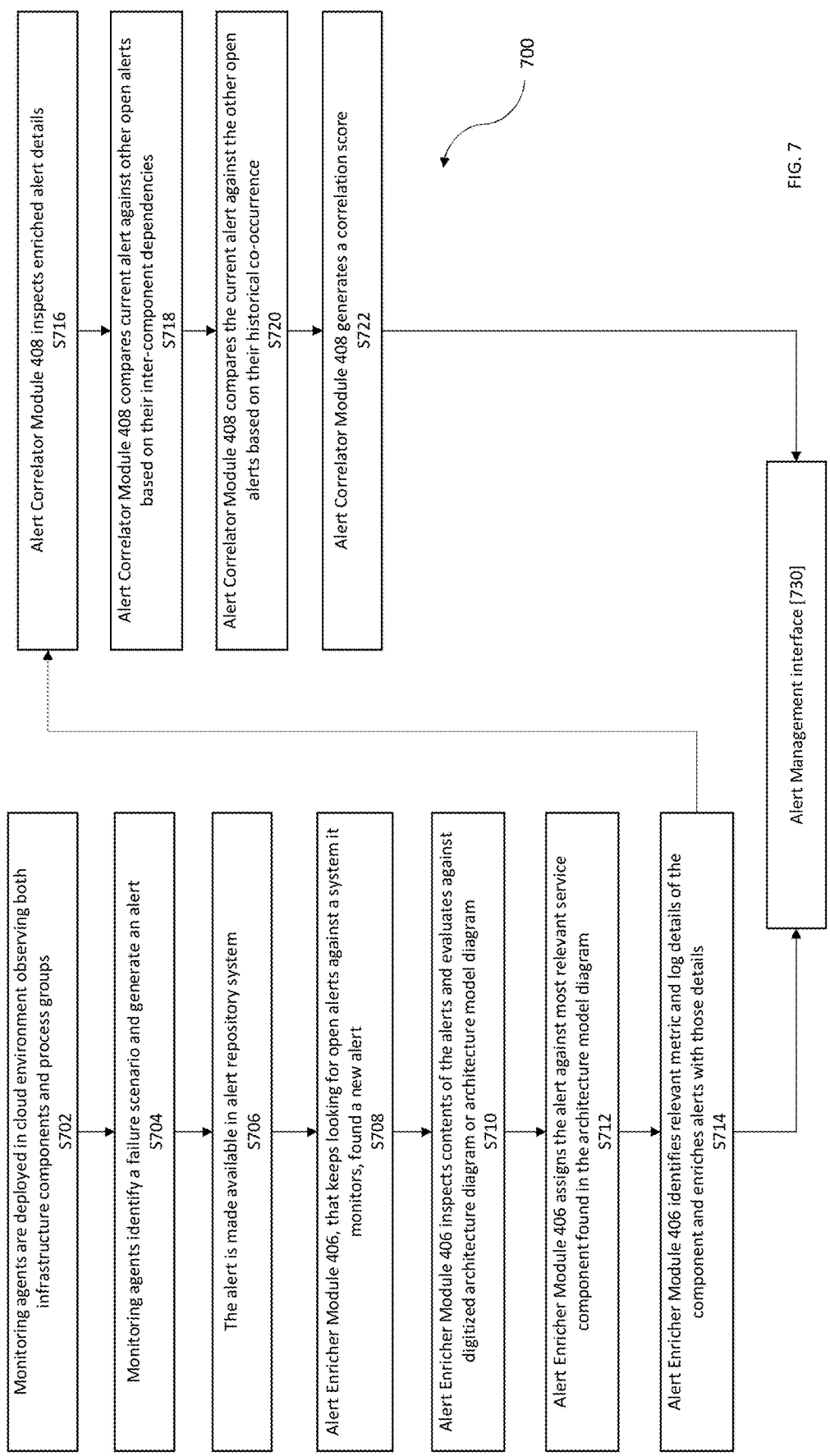
FIG. 7 illustrates an exemplary method flow diagram for providing an alert management interface and a correlation score, in accordance with an exemplary embodiment.

Referring to FIG. 7, an exemplary method flow diagram for providing an alert management interface and a correlation score, in accordance with an exemplary embodiment, is shown.

In method 700 of FIG. 7, at step S702, as shown, monitoring agents are deployed in a cloud environment observing both infrastructure components and the process groups. At step S704, the monitoring agents identify a failure scenario and generates an alert. At step S706, the alert is made available in an alert repository system. At step S708, an alert enricher module 406, that keeps looking for open alerts against a system it monitors, found a new alert. At step S710, the alert enricher module 406 inspects content of the alerts and evaluates against digitized architecture diagram or architecture model diagram. At step S712, the alert enricher module 406 assigns the alert against most relevant service component found in the architecture model diagram. At step S714, the alert enricher module 406 identifies relevant metric and log details of the component and enriches the alerts with those details, and feeds the enriched alert details to a user interface, that is shown as alert management interface 730 in FIG. 7. At step S716, the alert correlator module 408 inspects the enriched alert details. At step S718, the alert correlator module 408 compares current alert against other open alerts based on their inter-component dependencies. At step S720, the alert correlator module 408 compares the current alert against other open alerts based on their historical co-occurrence. At step S722, the alert correlator module 408 generates a correlation score and feeds the score to the user interface or as shown, the alert management interface 730.

Therefore, the present disclosure provides a technical solution for managing alerts related to an application workflow. Also, the present disclosure provides the technical solution that overcomes the limitations of existing solutions such as including but is not limited to managing alerts as separate work items. Moreover, the technical solution as disclosed in the present disclosure provides technical effect and technical advantage over the existing solutions as the technical solution encompasses: 1) presenting alerts with context, like service details, deployment state, upstream and downstream services etc., 2) bringing design, e.g., architecture, and runtime, or alerts together to solve for managing production alerts, and 3) reducing mean time to resolve (MTTR) an alert, at least by training site reliability engineering (SRE) team members with same material and approach that the SRE team member need to use for resolving an alert, hence making them more productive. Particularly, the present solution helps the SRE team members to look at an alert from a system architecture standpoint, and get corresponding dependent components that are impacted and a set of metrics. This helps reducing the mean time to resolve an alert.

Furthermore, an aspect of the present disclosure relates to a non-transitory computer readable storage medium storing instructions for managing a set of alerts related to an application workflow. The instructions include executable code which, when executed by a processor, may cause the processor to: detect, via a build time architecture digitizer 402, a request for a new infrastructure component provisioning in an existing architecture model, related to the application workflow; generate, via the build time architecture digitizer 402, an updated architecture model based on the existing architecture model and the request for the new infrastructure component provisioning; monitor, via a runtime architecture digitizer 404, a set of services related to the new infrastructure component; generate, via the runtime architecture digitizer 404, a final architecture model based on the set of services and the updated architecture model; receive, at an alert enricher module 406 via the communication interface from a database 206, the set of alerts; map, via the alert enricher module 406, at least one alert from among the set of alerts with at least one corresponding component from among the set of components of the final architecture model; assign, via the alert enricher module 406, the at least one corresponding component in the final architecture model to the at least one alert from among the set of alerts based on the mapping; enrich, via the alert enricher module 406, the at least one alert from among the set of alerts with at least one relevant metric from among a set of relevant metrics and a set of relevant log details based on the set of corresponding components; generate, via the alert enricher module 406, a set of enriched alerts based on the enriching of the at least one alert from among the set of alerts; and provide automatically, via the alert enricher module 406 on a user interface, at least one enriched alert from among the set of enriched alerts to manage the set of alerts.

In accordance with an exemplary embodiment, when executed by the processor, the executable code may further cause the processor to: receive, at an alert correlator module 408, the at least one enriched alert from among the set of enriched alerts; compare, via the alert correlator module

408, the at least one enriched alert from among the set of enriched alerts with a set of open alerts based on at least one from among a set of inter-component dependencies and a set of historical co-occurrences; generate, via the alert correlator module 408, a correlation score between the at least one enriched alert from among the set of enriched alerts and at least one open alert from among the set of open alerts based on the comparison; and provide automatically, via the alert correlator module 408 on the user interface, the correlation score to manage the set of alerts.

In accordance with an exemplary embodiment, the set of inter-component dependencies may indicate a dependency relation between the set of enriched alerts and the set of open alerts, and the set of historical co-occurrences may indicate a historical co-occurrence relation between the set of enriched alerts and the set of open alerts.

In accordance with an exemplary embodiment, when executed by the processor, the executable code may further cause the processor to: receive, at the alert correlator module 408 from a repository, an impact data corresponding to the set of alerts; generate, via the alert correlator module 408, a severity score for the set of alerts based on the impact data; and provide automatically, via the alert correlator module 408 on the user interface, the severity score to manage the set of alerts.

In accordance with an exemplary embodiment, the new infrastructure component is an infrastructure-as-code (IaC).

Therefore, the present disclosure provides a technical solution for managing a set of alerts related to an application workflow, which overcomes limitations of the existing solutions such as including but is not limited to the limitations of the known arts as described in the present disclosure.

Although the present disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the present disclosure has been described with reference to particular means, materials, and embodiments, the present disclosure is not intended to be limited to the particulars disclosed; rather the present disclosure extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The terms "computer-readable medium" and/or "computer-readable storage medium" shall also include any storage medium that is capable of storing, encoding, or carrying a set of instructions for execution by a processor or that causes a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the present disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application-specific integrated circuits, programmable logic arrays, and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the present disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the present disclosure. Other embodiments may be utilized and derived from the present disclosure, such that structural and logical substitutions and changes may be made without departing from the scope of the present disclosure. Additionally, the illustrations are merely representational and may not be drawn to scale. Certain proportions within the illustrations may be exaggerated, while other proportions may be minimized. Accordingly, the present disclosure and the figures are to be regarded as illustrative rather than restrictive.

One or more embodiments of the present disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the present disclosure is submitted with the understanding that it will not be used to interpret or limit the scope or meaning of the claims. In addition, in the foregoing Detailed Description, various features may be grouped together or described in a single embodiment for the purpose of streamlining the present disclosure. This disclosure is not to be interpreted as reflecting an intention that the claimed embodiments require more features than are expressly recited in each claim. Rather, as the following claims reflect, the inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for managing a set of alerts related to an application workflow, the method comprising:
   detecting, by at least one processor via a build time architecture digitizer, a request for a new infrastructure component provisioning in an existing architecture model related to the application workflow;
   generating, by the at least one processor via the build time architecture digitizer, an updated architecture model based on the existing architecture model and the request for the new infrastructure component provisioning;
   monitoring, by the at least one processor via a runtime architecture digitizer, a set of services related to the new infrastructure component;
   generating, by the at least one processor via the runtime architecture digitizer, a final architecture model based on the set of services and the updated architecture model;
   receiving, by the at least one processor at an alert enricher module via a communication interface from a database, the set of alerts;
   mapping, by the at least one processor via the alert enricher module, at least one alert from among the set of alerts with at least one corresponding component from among a set of components of the final architecture model;
   assigning, by the at least one processor via the alert enricher module, the at least one corresponding component in the final architecture model to the at least one alert from among the set of alerts based on the mapping;
   enriching, by the at least one processor via the alert enricher module, the at least one alert from among the set of alerts with at least one from among a set of relevant metrics and a set of relevant log details based on the at least one corresponding component;
   generating, by the at least one processor via the alert enricher module, a set of enriched alerts based on the enriching of the at least one alert from among the set of alerts; and
   providing automatically, by the at least one processor via the alert enricher module on a user interface, at least one enriched alert from among the set of enriched alerts to manage the set of alerts.

2. The method as claimed in claim 1, the method further comprises:
   receiving, by the at least one processor at an alert correlator module, the at least one enriched alert from among the set of enriched alerts;
   comparing, by the at least one processor via the alert correlator module, the at least one enriched alert from among the set of enriched alerts with a set of open alerts based on at least one from among a set of inter-component dependencies and a set of historical co-occurrences;
   generating, by the at least one processor via the alert correlator module, a correlation score between the at least one enriched alert from among the set of enriched alerts and at least one open alert from among the set of open alerts based on the comparison; and
   providing automatically, by the at least one processor via the alert correlator module on the user interface, the correlation score to manage the set of alerts.

3. The method as claimed in claim 2, wherein the set of inter-component dependencies indicates a dependency relation between the set of enriched alerts and the set of open alerts, and wherein the set of historical co-occurrences indicates a historical co-occurrence relation between the set of enriched alerts and the set of open alerts.

4. The method as claimed in claim 2, the method further comprises:
   receiving, by the at least one processor at the alert correlator module from a repository, an impact data corresponding to the set of alerts;
   generating, by the at least one processor via the alert correlator module, a severity score for the set of alerts based on the impact data; and
   providing automatically, by the at least one processor via the alert correlator module on the user interface, the severity score to manage the set of alerts.

5. The method as claimed in claim 2, wherein the correlation score suggests that a component that is most likely to be related to and affecting other components of the application workflow.

6. The method as claimed in claim 2, wherein the severity score suggests how likely is an end user to be impacted by malfunctioning of a component of the application.

7. The method as claimed in claim 1, wherein the new infrastructure component is an infrastructure-as-code (IaC).

8. A computing device for managing a set of alerts related to an application workflow, the computing device comprising:
   a processor;
   a memory; and
   a communication interface coupled to each of the processor and the memory, wherein the processor is configured to:
   detect, via a build time architecture digitizer, a request for a new infrastructure component provisioning in an existing architecture model related to the application workflow;
   generate, via the build time architecture digitizer, an updated architecture model based on the existing architecture model and the request for the new infrastructure component provisioning;
   monitor, via a runtime architecture digitizer, a set of services related to the new infrastructure component;
   generate, via the runtime architecture digitizer, a final architecture model based on the set of services and the updated architecture model;
   receive, at an alert enricher module via the communication interface from a database, the set of alerts;
   map, via the alert enricher module, at least one alert from among the set of alerts with at least one corresponding component from among a set of components of the final architecture model;

assign, via the alert enricher module, the at least one corresponding component in the final architecture model to the at least one alert from among the set of alerts based on the mapping;

enrich, via the alert enricher module, the at least one alert from among the set of alerts with at least one from among a set of relevant metrics and a set of relevant log details based on the at least one corresponding component;

generate, via the alert enricher module, a set of enriched alerts based on the enriching of the at least one alert from among the set of alerts; and provide automatically, via the alert enricher module on a user interface, at least one enriched alert from among the set of enriched alerts to manage the set of alerts.

9. The computing device as claimed in claim 8, wherein the processor is further configured to:
receive, at an alert correlator module, the at least one enriched alert from among the set of enriched alerts;
compare, via the alert correlator module, the at least one enriched alert from among the set of enriched alerts with a set of open alerts based on at least one from among a set of inter-component dependencies and a set of historical co-occurrences;
generate, via the alert correlator module, a correlation score between the at least one enriched alert from among the set of enriched alerts and at least one open alert from among the set of open alerts based on the comparison; and
provide automatically, via the alert correlator module on the user interface, the correlation score to manage the set of alerts.

10. The computing device as claimed in claim 9, wherein the set of inter-component dependencies indicates a dependency relation between the set of enriched alerts and the set of open alerts, and wherein the set of historical co-occurrences indicates a historical co-occurrence relation between the set of enriched alerts and the set of open alerts.

11. The computing device as claimed in claim 9, wherein the processor is further configured to:
receive, at the alert correlator module from a repository, an impact data corresponding to the set of alerts;
generate, via the alert correlator module, a severity score for the set of alerts based on the impact data; and
provide automatically, via the alert correlator module on the user interface, the severity score to manage the set of alerts.

12. The computing device as claimed in claim 9, wherein the correlation score suggests that a component that is most likely to be related to and affecting other components of the application workflow.

13. The computing device as claimed in claim 9, wherein the severity score suggests how likely is an end user to be impacted by malfunctioning of a component of the application.

14. The computing device as claimed in claim 8, wherein the new infrastructure component is an infrastructure-as-code (IaC).

15. A non-transitory computer readable storage medium storing instructions for managing a set of alerts related to an application workflow, the instructions including an executable code which, when executed by a processor, may cause the processor to:
detect, via a build time architecture digitizer, a request for a new infrastructure component provisioning in an existing architecture model related to the application workflow;

generate, via the build time architecture digitizer, an updated architecture model based on the existing architecture model and the request for the new infrastructure component provisioning;
monitor, via a runtime architecture digitizer, a set of services related to the new infrastructure component;
generate, via the runtime architecture digitizer, a final architecture model based on the set of services and the updated architecture model;
receive, at an alert enricher module via a communication interface from a database, the set of alerts;
map, via the alert enricher module, at least one alert from among the set of alerts with at least one corresponding component from among a set of components of the final architecture model;
assign, via the alert enricher module, the at least one corresponding component in the final architecture model to the at least one alert from among the set of alerts based on the mapping;
enrich, via the alert enricher module, the at least one alert from among the set of alerts with at least one from among a set of relevant metrics and a set of relevant log details based on the at least one corresponding component;
generate, via the alert enricher module, a set of enriched alerts based on the enriching of the at least one alert from among the set of alerts; and
provide automatically, via the alert enricher module on a user interface, at least one enriched alert from among the set of enriched alerts to manage the set of alerts.

16. The storage medium as claimed in claim 15, wherein when executed by the processor, the executable code further causes the processor to:
receive, at an alert correlator module, the at least one enriched alert from among the set of enriched alerts;
compare, via the alert correlator module, the at least one enriched alert from among the set of enriched alerts with a set of open alerts based on at least one from among a set of inter-component dependencies and a set of historical co-occurrences;
generate, via the alert correlator module, a correlation score between the at least one enriched alert from among the set of enriched alerts and at least one open alert from among the set of open alerts based on the comparison; and
provide automatically, via the alert correlator module on the user interface, the correlation score to manage the set of alerts.

17. The storage medium as claimed in claim 16, wherein the set of inter-component dependencies indicates a dependency relation between the set of enriched alerts and the set of open alerts, and wherein the set of historical co-occurrences indicates a historical co-occurrence relation between the set of enriched alerts and the set of open alerts.

18. The storage medium as claimed in claim 16, wherein when executed by the processor, the executable code further causes the processor to:
receive, at the alert correlator module from a repository, an impact data corresponding to the set of alerts;
generate, via the alert correlator module, a severity score for the set of alerts based on the impact data; and
provide automatically, via the alert correlator module on the user interface, the severity score to manage the set of alerts.

19. The storage medium as claimed in claim 16, wherein the correlation score suggests that a component that is most likely to be related to and affecting other components of the application workflow, and wherein the severity score suggests how likely is an end user to be impacted by malfunctioning of a component of the application.

20. The storage medium as claimed in claim 15, wherein the new infrastructure component is an infrastructure-as-code (IaC).

* * * * *